US006965372B1

(12) United States Patent
Woods

(10) Patent No.: US 6,965,372 B1
(45) Date of Patent: Nov. 15, 2005

(54) USER FRIENDLY KEYBOARD

(76) Inventor: Debra L. Woods, 12776 Bombay Way, Woodbridge, VA (US) 22192

( * ) Notice: Subject to any disclaimer, the term of this patent is extended or adjusted under 35 U.S.C. 154(b) by 523 days.

(21) Appl. No.: 09/534,474

(22) Filed: Mar. 24, 2000

(51) Int. Cl.$^7$ .............................................. G09G 5/00
(52) U.S. Cl. ..................... 345/168; 345/156; 341/22; 400/485; 400/486; 400/489
(58) Field of Search ............................. 345/168–172, 345/156–160; 341/22–23; 400/486–489, 400/472, 473, 476, 485; 463/37–38

(56) References Cited

U.S. PATENT DOCUMENTS

| 943,466 | A | | 12/1909 | Rowell |
| 3,847,263 | A | | 11/1974 | X |
| 3,929,216 | A | | 12/1975 | Einbinder |
| 4,211,497 | A | * | 7/1980 | Montgomery ............... 400/486 |
| 4,244,659 | A | | 1/1981 | Malt |
| 4,332,493 | A | | 6/1982 | Einbinder |
| 4,613,247 | A | | 9/1986 | McGunnigle |
| 4,633,227 | A | | 12/1986 | Menn |
| 4,844,637 | A | | 7/1989 | Buisson et al. |
| 4,849,732 | A | | 7/1989 | Dolenc |
| 4,974,183 | A | | 11/1990 | Miller |
| 5,006,001 | A | | 4/1991 | Vulcano |
| 5,065,003 | A | * | 11/1991 | Wakatsuki et al. .......... 235/472 |
| 5,143,462 | A | | 9/1992 | Klauber |
| 5,212,638 | A | | 5/1993 | Bernath |
| 5,336,002 | A | * | 8/1994 | Russo ........................ 400/489 |
| 5,352,050 | A | * | 10/1994 | Choate ....................... 400/486 |
| 5,410,333 | A | | 4/1995 | Conway |
| 5,458,425 | A | | 10/1995 | Torok |
| 5,481,263 | A | | 1/1996 | Choi |
| 5,498,088 | A | | 3/1996 | Choate |
| 5,557,299 | A | * | 9/1996 | Maynard et al. ............ 345/168 |
| 5,560,724 | A | * | 10/1996 | Iwasa et al. ................ 400/488 |
| 5,600,827 | A | * | 2/1997 | Nakabayashi et al. ......... 707/2 |
| 5,620,267 | A | * | 4/1997 | Klauber ..................... 400/486 |
| 5,711,624 | A | | 1/1998 | Klauber |
| 5,739,776 | A | * | 4/1998 | Chen ........................... 341/22 |
| 5,818,357 | A | * | 10/1998 | Motoyama et al. ........... 341/20 |
| 5,836,705 | A | | 11/1998 | Choate |
| 5,879,089 | A | | 3/1999 | Armel |
| 5,880,685 | A | * | 3/1999 | Weeks .......................... 341/22 |
| 6,107,994 | A | * | 8/2000 | Harada et al. .............. 345/168 |

FOREIGN PATENT DOCUMENTS

| JP | 8-249097 A | * | 9/1996 | ............. G06F 3/02 |
| JP | 08249097 A | * | 9/1996 | |

OTHER PUBLICATIONS

<<MacWeek>> "Datadesk Taks New Approach to Keyboard Design" Sep. 1990.*
Microsoft Press Computer dictionary Third Edition 1997 pp. 21, 22 and 433.*

* cited by examiner

Primary Examiner—Lun-yi Lao
(74) Attorney, Agent, or Firm—Diederiks & Whitelaw, PLC

(57) ABSTRACT

A keyboard arranged for enhanced typing speed and easy memorization includes a home row provided with a series of simple words which incorporate the most commonly used letters of the alphabet. Arranged in a central zone above the home row are tab and delete keys, to allow for faster and easier utilization. Various word processing function and symbol keys are placed along the top row and down opposing sides of the keyboard. Each symbol and function key can preferably perform multiple functions, when pressed along with one of various shift command keys. Preferably, three different shift command keys are located at a bottom central portion of the keyboard, along with enter and space keys.

18 Claims, 2 Drawing Sheets

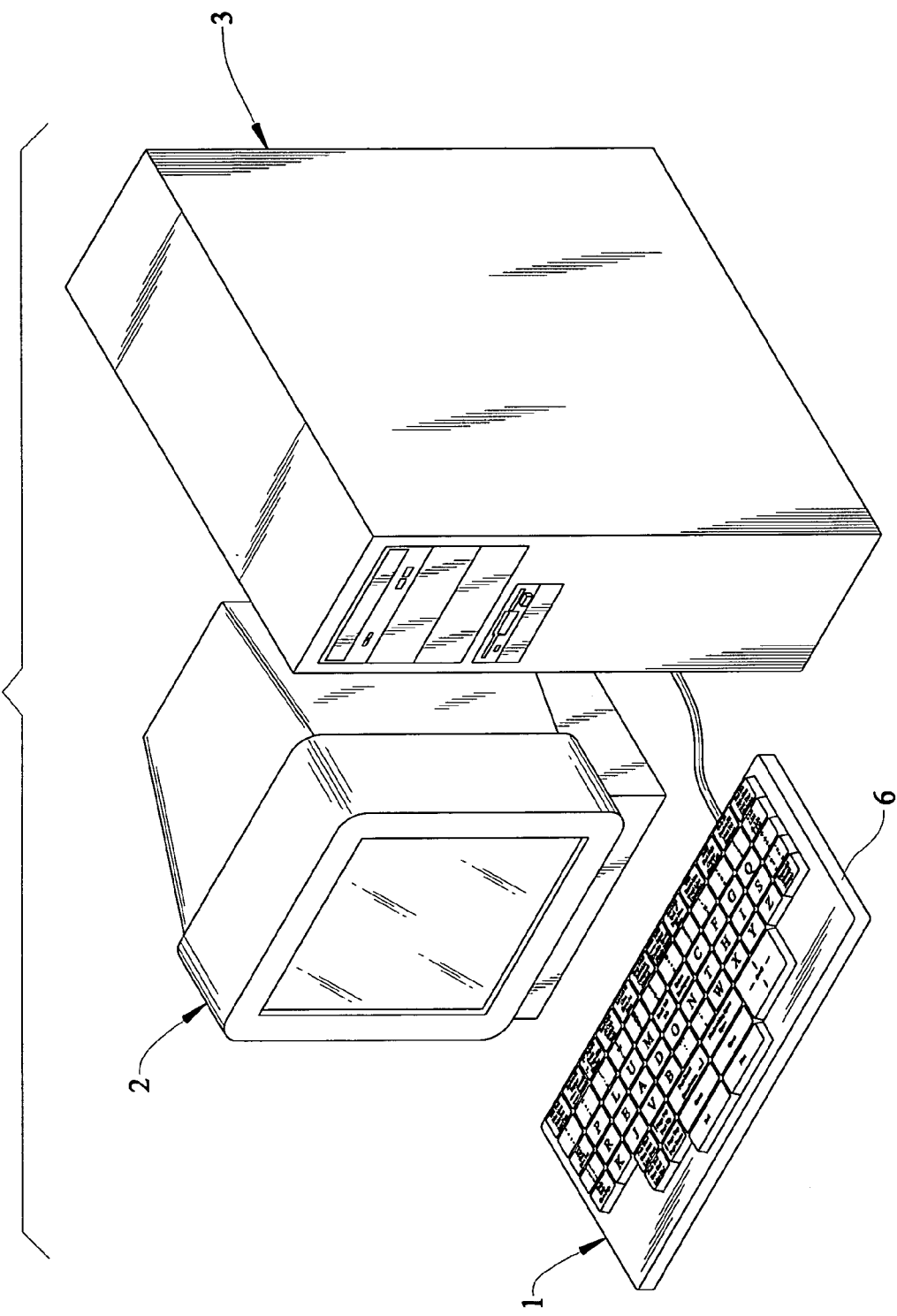

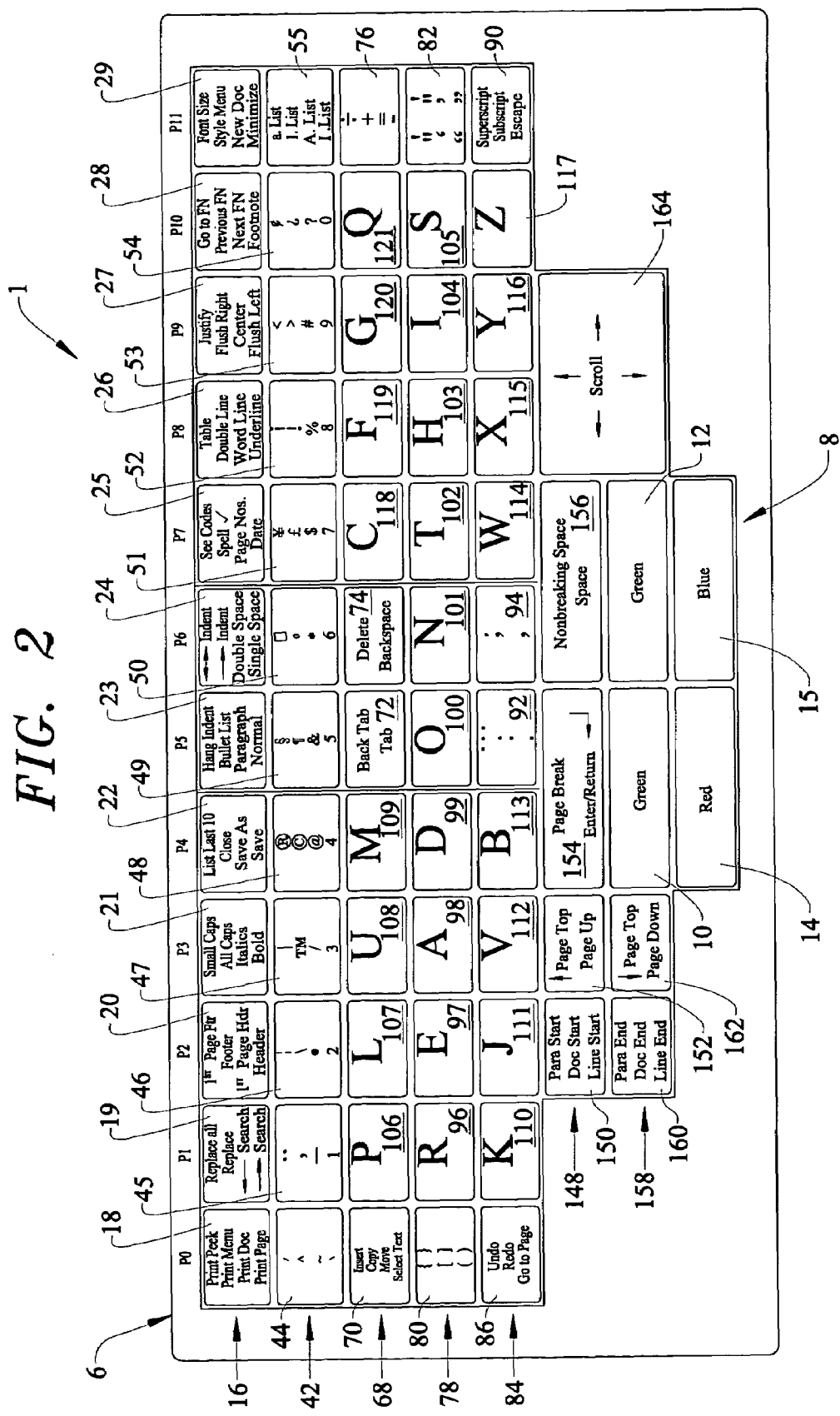

USER FRIENDLY KEYBOARD

BACKGROUND OF THE INVENTION

1. Field of the Invention

This invention concerns a user friendly keyboard, for use with a computer or any other device capable of providing word processing services, having command keys arranged to allow for faster activation of common word processing functions. In addition, the letter keys are arranged to promote easier learning and faster typing.

2. Discussion of the Prior Art

Since the invention of the typewriter, there have been various proposals concerning different key arrangements. The first key arrangements had the letter keys placed in alphabetical order. Regardless of the arrangement of the keys, when a key was pressed in such an earlier typewriter, a metal hammer would be lifted to strike a ribbon which left an image on the paper. If the typist was too quick, multiple hammers would be positioned in a strike zone at the same time and collide, thus jamming. Jamming would force the typist to manually separate the lodged hammers.

The QWERTY keyboard, the industry standard, was designed to eliminate this problem. QWERTY located the most commonly used letters away from the home row (where the fingers rest) to slow the typist down, thus the hammers no longer jammed. The result? The QWERTY keyboard jams the fingers rather than the hammers. In typing on a QWERTY keyboard, the fingers are required to travel much longer distances than the fingers would be required to do if the most common letters were placed on the home row of keys. This extra flexing of the fingers greatly reduces typing speed, increases injury, and limits use by certain disabled typists. Plus, the disarray of the keys themselves (the lack of a grid pattern) forces the fingers into awkward positions which further exacerbates typing fluidity. In QWERTY, the keys that are located under the two strongest fingers, i.e., the index and middle fingers, are among the least often used keys. In addition, by moving the keys out of their alphabetical format made learning to type frustratingly slow because of the length of time needed to master the placement of the keys. This lack of pattern, alphabetical or otherwise, is very intimidating for the beginner typist. Thus, typists have been unnecessarily burdened with an inefficient keyboard.

The QWERTY keyboard worked well when typewriters used hammers to strike platens. However, the majority of today's keyboards do not use hammers, but are associated with a computing source and a printer. When keys are pressed, the hardware within the computer determines which symbol should be displayed and later printed on the page, without any of the mechanical movements associated with traditional typewriters. When QWERTY keyboards are used, today's typists are slowed down just as the first users of the QWERTY keyboard were. Certainly, the modern typist should be able to type without being slowed down by the physical arrangement of the keys. But, because the majority of the keyboards being used are of the QWERTY type, there is an unnecessary impediment to fast typing.

Various keyboards have been developed to eliminate the problems associated with the QWERTY keyboard. That is, a number of keyboard systems have been invented which utilize a variation of the QWERTY keyboard. Most keyboard alterations generally represent reorganizations of the letter keys, but retain the basic function keys, i.e., space-bar, enter, shift, delete and tab keys, in their traditional positions. For instance, it has been proposed in the art to position the most commonly used keys in the center or home row on the keyboard in order to enhance potential typing speeds. Unfortunately, the letters have not been arranged in a most advantageous manner. It has also been proposed to allow a keyboard user to select and program the letter keys into different configurations, while maintaining the positions of the basic function keys. This is a problem because, as discussed above, the shift and enter keys are used very often and are located closest to the weakest fingers. Also, in order to get into position to press the shift and enter keys, the correct finger must travel a great distance across the keyboard, which slows down any typing.

When the traditional keyboards are used for word processing, many of the commands must be selected by a menu system or by a series of keys. Again, this restriction also decelerates the typing speed. For example, with the common word processing applications and the standard QWERTY computer keyboards, in order to insert page numbers, the user is often required to select the correct listing from a menu and then find the correct selection which activates the page numbering function. Other simple functions, such as switching from paragraph text to block text, cannot be executed via one simple keystroke. Instead, the user must go through several steps for the desired result.

There are also shortcuts designed to save a step, but the typist must remember the proper sequence of each particular shortcut. In general, it is essentially considered that each common command sequence which requires more than one simple keystroke is an unnecessary expenditure of typing time especially when the same functions are selected repeatedly.

Based on the above, there exists a need in the art for an enhanced keyboard arrangement which will enable the user to type and process words more quickly, efficiently, and effortlessly. More specifically, there exists a need for a user friendly keyboard wherein the order of the letter keys are optimized and a number of function keys are provided to easily perform a typing task employing the most common word processing commands and can be easily understood by the beginner. This is imperative given the demands in today's society to be computer literate.

SUMMARY OF THE INVENTION

The present invention is directed to a keyboard including a plurality of keys arranged in a series of rows particularly configured to enable a user to most rapidly master the location of the individual keys and also to increase the typing speed. Primarily, the home row of letter keys includes the most often used letters in the English language. More particularly, the keyboard includes letter keys which are arranged in an easy to learn and remember format so as to be user friendly. This is accomplished by placing the most often used letter keys on the home row in a series of simple words "READ ON THIS". The remainder of the letter keys are also arranged about the main row in four series of four letters each. To the upper left of the home row is the word PLUM. To the bottom left is the acronym KJVB, which represents the first letters of a well-known book, King James Version of the Bible. To the bottom right are the letters W, X, Y, and Z, with the remaining letters located to the upper right of the home row. The keys are placed on a grid pattern to substantially alleviate awkward left and right finger movement which can cause injury. It should be noted that optimizing finger movement will increase typing fluidity and thereby increase speed. Typing speed, however, will always be influenced by an individual's motor skills, i.e., we can strike the keys only as fast as we can think.

Located near the bottom of the keyboard are shift command keys. In accordance with the most preferred embodiment of the invention, there are two Green keys, which generally correspond to the shift keys of the traditional keyboard. There are also two other shift command keys, located near the Green keys, which are used to activate other functions of the word processing keys. The word processing function keys extend across the face of the keyboard above the number keys. Each of the word processing function keys has the ability to take on four different functions when depressed with one of the shift command keys or depressed alone. The Tab, Enter, and Delete keys are also placed centrally in the keyboard to permit easier activation of these keys. Preferably, placed at the bottom and to the right of the keyboard is a single scroll button. This button is biased to a center position and rocking it in any of the four primary directions causes a cursor to move up, down, left, or right respectively. The foregoing attributes ensures a user friendly typing experience.

Additional objects, features and advantages of the present invention will become more readily apparent from the following detailed description of a preferred embodiment thereof when taken in conjunction with the drawings wherein like reference numerals refer to corresponding parts in the several views.

BRIEF DESCRIPTION OF THE DRAWINGS

FIG. 1 depicts a desktop computer system incorporating a keyboard constructed in accordance with the invention, as well as a monitor and a central processing unit; and FIG. 2 depicts an enlarged view of the keyboard of FIG. 1, detailing the arrangement of the keys.

DETAILED DESCRIPTION OF THE PREFERRED EMBODIMENT

FIG. 1 depicts a keyboard 1 of the invention as traditionally used with a common computer monitor 2 and a desktop computer 3. As can be seen in FIG. 1, the keyboard 1 is not a traditional QWERTY keyboard, but has been reconfigured, as per the invention. Although the keyboard 1 is shown with a separate monitor 2 and a hardwired desktop computer 3, the keyboard 1 itself may be integrated with the processing unit and display or even incorporated as part of a more traditional typewriter.

In FIG. 2, a detailed view of the keyboard 1 of the invention can be seen. Keyboard 1 essentially includes a base 6 with raised keys thereupon. The keys are generally arranged in a grid pattern, with a shift command key zone 8 located at the bottom, straddling a center zone. Generally confined to a rectangular area, the shift key zone 8 includes shift or control keys 10, 12, 14 and 15. The left Shift key 10 and right Shift key 12 are at the top of the rectangle, with the Shift key 14 at the left bottom and the Shift key 15 at the right bottom of the rectangle. Each of the keys in the shift command key zone 8 is in a manner generally analogous to the shift keys in the standard QWERTY keyboard. For example, when the shift key 14 is depressed at the same time as another key, that key takes on a different function. Although a more detailed operational discussion will be provided below, in general, three different shift key commands are possible through Shift keys 10, 12, 14 and 15 such that each of the other keys on the keyboard 1 are capable of four different functions, i.e. depressed alone, depressed with the upper left Shift key 10 or the upper right Shift key 12, depressed with the lower left Shift key 14, or depressed with the lower right Shift key 15.

Along the top of keyboard 1 is a first uppermost row 16. Row 16 is shown to include twelve keys 18–29 placed side by side in columns and extending substantially across the face of keyboard 1. In general, keys 18–29 take on functions known in the art of typing but which are typically not accessible through a direct key depression. For the sake of completeness, each of the keys 18–29 and their corresponding functions will be described in detail. Moving from right-to-left, the first key 18 in first row 16, $1^{st}$ column is the "Print Peek/Print Menu/Print Doc/Print Page" key, which is used to activate Print Peek, Print Menu, Print Document, and Print Page commands or functions. Each of the four functions associated with this key 18 is activated by depressing key 18 along with one of the shift keys in zone 8, or alone. The Print Peek command is activated by depressing key 18 along with Shift key 14 and generates an image on monitor 2 of how the document will appear when printed. The Print Menu command is activated by depressing key 18 along with Shift key 15 and brings up a printing menu. The Print Document command is activated by depressing key 18 along with either Shift key 10 or Shift key 12, which functions to cause the current document to be printed. The Print Page command is activated by depressing key 18 alone, without any of the shift command keys 10, 12, 14, 15 in zone 8 and prints the page currently displayed on monitor 2. Although not shown in the drawings, key 18 preferably is color coded to assist the typist, i.e. "Print Peek" is preferably in red, "Print Menu" in blue, "Print Doc" in green, and "Print Page" in black in combination with the color coding of Shift keys 10, 12, 14 and 15.

The second key in Row 16 is the "Replace All/Replace/ ←Search/→Search" key 19. Each of the functions associated with key 19 is activated by depressing key 19 along with one of the shift command 10, 12, 14, 15 in zone 8 keys, or alone. The Replace All command is activated by depressing key 19 along with Shift key 14 and finds each occurrence of a specified text in the current document and substitutes therefor an altered text. The Replace command is activated by depressing key 19 along with Shift key 15 to allow the next occurrence of a specified text in the current document to be replaced with an altered text. The ←Search command is activated by depressing key 19 along with either Shift key 10 or Shift key 12. This command sequence causes a specified text search to be performed from the cursor position back toward the beginning of the document. The →Search command is activated by depressing key 19 without any of the shift command keys 10, 12, 14 or 15 in zone 8. This command sequence causes a specified text search from the cursor position to the end of the document. Key 19 itself is also preferably color coded to assist the typist, i.e. "Replace All" is in red, "Replace" in blue, "←Search" in green, and "→Search" in black.

The third key in Row 16 is the "$1^{st}$38 Page Footer/Footer/ $1^{st}$ Page Header/Header" key 20. Each of the functions associated with key 20 is activated by depressing key 20 along with one of the shift command keys 10, 12, 14, 15 or alone. The $1^{st}$ Page Footer command is activated by depressing key 20 along with the Shift key 14 and allows access within a footer on the first page. Selecting the Escape key returns the cursor to the text. The Footer command is activated by depressing key 20 along with the Shift key 15 and allows access to the footer of each of the other pages. Selecting the Escape key returns the cursor to the text. The $1^{st}$ Page Header command is activated by depressing key 20 along with either Shift key 10 or Shift key 12, and allows access to the header on the first page. Selecting the Escape key returns the cursor to the text. Pressing key 20 alone activates the Header command, which allows access to the header on every other page. Selecting the Escape key returns the cursor to the text. Again key 20 is preferably color coded to assist the typist, i.e. "1$^{st}$ Page Footer" is red, "Footer" is blue, "1$^{st}$ Page Footer" is green, and "Footer" is black.

The fourth key in Row 16 is the "Small Caps/All Caps/Italics/Bold" key 21. Each of the functions associated with key 21 is activated by depressing key 21 along with one of the shift command keys 10, 12, 14, 15 or alone. The Small Caps function is selected by depressing key 21 along with Shift key 14 and causes any later typed text to appear in small capital letters and the beginning of each word in large capital letters. Selecting this function again returns the font style to normal letters. The All Caps function is selected by depressing key 21 along with Shift key 15 in order to cause any later typed text to be in capital letters. Selecting this function again returns the font style to normal letters. The Italics function is selected by depressing the key 21 along with either Shift key 10 or Shift key 12, and causes any later typed text to appear italicized. Selecting this function again returns the font style to non-italicized style. The Bold function is selected by depressing key 21 alone, without any of the shift command keys 10, 12, 14 or 15, and causes later typed text to appear in a bold font style. Selecting this function again returns the font style to non-bold format. The key 21 itself is color coded to assist the typist in selecting the required key sequencing to perform the desired function, i.e. "Small Caps" is in red, "All Caps" in blue, "Italics" in green, and "Bold" in black.

The fifth key in Row 16 is the List Last 10/Close/Save As/Save key 22. Each of the functions associated with this key 22 is activated by depressing key 22 along with one of the shift command keys 10, 12, 14, 15 or alone. The List Last 10 function is activated by depressing key 22 along with Shift key 14 and brings up a menu which allows the user to see a listing of the last ten documents edited. From this list, the user can easily choose one of those ten to recall. The Close command is activated by depressing key 22 along with Shift key 15 in order to remove the current document from the monitor and saves it. The Save As command is activated by depressing key 22 along with either Shift key 10 or Shift key 12. This command allows the user to save the current document after choosing a filename for the document and leaves the document displayed on the monitor. The Save command is activated by depressing key 22 without any of the shift command keys in zone 8 and functions to save the current document with a previously assigned filename and leaves the document displayed on the monitor. Again, key 22 is preferably color coded to assist the typist, i.e. "List Last 10" is in red, "Close" in blue, "Save As" in green, and "Save" in black.

The sixth key in Row 16 is the Hang Indent/Bullet List/Paragraph/Normal key 23. Each of the functions associated with key 23 is activated by depressing key 23 along with one of the shift command keys 10, 12, 14, 15 or alone. The Hanging Indent style is selected by depressing key 23 along with Shift key 14 to cause the text to be formatted such that every line or paragraph after the first is indented until another style is selected. The Bullet List style is selected by depressing key 23 along with Shift key 15 to cause the text to be formatted such that every line or paragraph begins with a bullet until another style is selected. The Paragraph function is selected by depressing key 23, along with either Shift key 10 or Shift key 12. This command indents the first line of the current and subsequent paragraphs until another style is selected. A Normal style is selected by depressing key 23 without any of the shift command keys 10, 12, 14, 15. Selecting the normal style starts text at the margin without any indentation. Key 23 is also preferably color coded to assist the typist, i.e. "Hang Indent" is presented in red, "Bullet List" in blue, "Paragraph" in green, and "Normal" in black.

The seventh key in Row 16 is the ↔Indent/→Indent/Double Space/Single Space key 24. Each of the functions associated with this key is activated by depressing key 24 along with one of the shift command keys 10, 12, 14, 15 or alone. The ↔Indent command is activated by depressing key 24 along with Shift key 14. This command indents text equally from the left and right margins until another style is selected. The →Indent command is activated by depressing key 24 along with Shift key 15 and causes text to be indented from the left margin until another style is selected. Double Space typing is selected by depressing key 24 along with either Shift key 10 or Shift key 12 and places text in a double spaced format. The Single Space format is selected by depressing key 24 without any of the shift command keys in zone 8 and places text in a single spaced format. The words on key 24 is preferably color coded to assist the typist, i.e. "↔Indent" is red, "→Indent" is blue, "Double Space" is green, and "Single Space" is black.

The eighth key in Row 16 is the See Codes/Spell✓/Page Nos./Date key 25. Each of the functions associated with this key is activated by depressing key 25 along with one of the shift command keys 10, 12, 14, 15 or alone. The See Codes function is selected by depressing key 25 along with Shift key 14 in order to display the codes associated with the document, such as single space, bold, indent, etc. The Spell ✓ function is executed by depressing key 25 along with Shift key 15 and starts a program to check the spelling. The Page Nos. command is activated by depressing key 25 along with either Shift key 10 or Shift key 12 in order to insert page numbers on each page of the document as set up in the default. The Date command is activated by depressing key 25 without any of the shift command keys 10, 12, 14, 15 and is used to insert the current date as set up in the default. Key 25 is preferably color coded to assist the typist, i.e. "See Codes" is in red, "Spell" in blue, "Page Nos." in green, and "Date" in black.

The ninth key in Row 16 is the Table/Double Line/Word Line/Underline key 26. Each of the functions associated with key 26 is activated by depressing key 26 along with one of the shift command keys 10, 12, 14, 15 or alone. The Table command is activated by depressing key 26 along with Shift key 14 in order to insert a table into the current document. The Double Line command is activated by depressing key 26 along with Shift key 15 to place a double underline below the characters and spaces typed thereafter until deactivated. The Word Line command is activated by depressing key 26 along with either Shift key 10 or Shift key 12 and puts a single underline below the characters typed thereafter until deactivated, while no underlining is placed below the spaces. The Underline function is selected by depressing key 26 without any of the shift command keys in zone 8, and functions to provide a single underline below each of the characters typed thereafter, including the spaces until deactivated. Key 26 itself is preferably color coded to assist the typist, i.e. "Table" is red, "Double Line" is blue, "Word Line" is green, and Underline is black.

The tenth key in Row 16 is the Justify/Flush Right/Center/Flush Left key 27. Each of the functions associated with key 27 is activated by depressing key 27 along with one of the shift command keys in zone 8 or alone. The Justify style is selected by depressing key 27 along with Shift key 14 and causes the text to be justified to the left and rights margins. The Flush Right style is selected by depressing key 27 along with Shift key 15 and causes the text to align only with the right margin. The Center style is selected by depressing key 27 along with either Shift key 10 or Shift key 12 to cause the text to be centered horizontally between the left and right margins. The Flush Left format is selected by depressing key 27 without any of the shift command keys 10, 12, 14, 15 to cause the text to align only with the left margin. Key 27 itself is color coded to assist the typist, i.e. "Justify" is in red, "Flush Right" is in blue, "Center" is in green, and "Flush Left" is in black.

The eleventh key in Row 16 is the Go to FN/Previous FN/Next FN/Footnote key 28. Each of the functions associated with key 28 is activated by depressing key 28 along with one of the shift keys 10, 12, 14, 15 or alone. The Go to FN command is activated by depressing key 28 along with Shift key 14 and allows the typist access to a specific footnote. The Previous FN command is activated by depressing key 28 along with Shift key 15 and brings the typist to the previous footnote in the text. The Next FN command is activated by depressing key 28 along with either Shift key 10 or Shift key 12 and brings the typist to the next footnote in the text. The FN command is activated by depressing key 28 without any of the shift command keys in zone 8 and operates to insert a footnote in the text of the document. Pressing the Escape key returns the cursor to the main text at the point of exit. The key 28 itself is color coded to assist the typist, i.e. "Go to FN" is red, "Previous FN" is blue, "Next FN" is green, and "Footnote" is black.

The final key in Row 16 is the Font Size/Style Menu/New Doc/Minimize key 29. In a manner corresponding to the other keys in row 16, each of the functions associated with key 29 is activated by depressing the key 29 along with one of the shift command keys 10, 12, 14, 15 or alone. The Font Size command is activated by depressing key 29 along with Shift key 14 and allows the typist to change the font size of the text. The Style Menu is activated by depressing key 29 along with Shift key 15 and brings up a menu from which the typist is able to select a different text format or style. The New Doc command is selected by depressing key 29 along with either Shift key 10 or Shift key 12 to create a new blank document. The Minimize command is selected by depressing key 29 without any of the shift command keys 10, 12, 14, 15 and minimizes the current document. Again, key 29 is color coded in accordance with the most preferred embodiment of the invention to assist the typist, i.e. "Font Style" is in red, "Style Menu" in blue, "New Doc" in green, and "Minimize" in black.

As indicated above, many of the functions described above with respect to keys 18–29 are currently available in word processing programs currently on the market. Therefore, a majority of the discussion above is simply provided for the sake of completeness. The present invention advantageously presents the most commonly used functions represented in row 16 in order to avoid the need to access various headings and subheadings generally required by utilizing a mouse in contemporary word processing programs. For instance, key 24 can be used to establish single and double space typing formats. By simply pressing key 24 directly, a single spacing format is established. Pressing one of Shift keys 10 or 12 in combination with key 24, directly establishes a double space typing format as discussed in detail above. In a contemporary word processing program, one would normally have to utilize a mouse to first access a format heading provided on a toolbar, followed by clicking on a "paragraph" sub-heading and then accessing a further subheading for the line spacing where the user can input the desired spacing. Therefore, multiple stages must be performed in order to carry out this very common word processing task in accordance with the prior art. However, as discussed above, function key 24 enables these tasks to be readily performed in a minimal amount of control sequences. The same is true with respect to the function of many of the other keys in row 16. Again, it should be remembered that the present invention is directed to a keyboard which can be more readily mastered than a standard QWERTY-style keyboard and which will enable a typist to perform common tasks at a much more rapid pace. Minimizing the use of a mouse is considered an integral part in achieving this function, particularly with respect to style set-up, editing, formatting and the like functions. Attention is directed to the beginner who may not be familiar with all of the many attributes word processing programs offer. This present keyboard embodies a user friendly format where the most basic functions are more readily accessible and most easily understood.

Below first or uppermost Row 16 is a second Row 42. Row 42 is shown to include twelve keys 44–55 placed side by side and extending substantially across the face of the keyboard 1, with each key 44–55 being arranged below and aligned with a respective key in Row 16. Each of the keys in Row 42 represents four different characters to be inserted into the current document upon selection. The four individual characters are selected via depressing the specific key alone or with one of the Shift keys 10, 12, Shift key 15, or Shift key 14. The characters printed on the key itself correspond to the shift command key 10, 12, 14, 15 in zone 8 which must be used along with the key to insert that character.

The following table lists the key number and corresponding Shift key 10, 12, 14, 15, if any, needed to establish the preferred characters to be inserted. Note that keys 44 and 45 include diacritical marks that will appear in proper placement with the next character typed.

| Key No. | Shift key 14 | Shift key 15 | Shift key 10, 12 | None |
|---------|--------------|--------------|------------------|------|
| 44      | ´            | ˆ            | ~                | `    |
| 45      | ¨            | ;            | —                | 1    |
| 46      | ¦            | \            | ●                | 2    |
| 47      | ¦            | ™            | /                | 3    |
| 48      | ®            | ©            | @                | 4    |
| 49      | §            | ¶            | &                | 5    |
| 50      | □            | ○            | *                | 6    |
| 51      | ¥            | £            | $                | 7    |
| 52      | ¡            | !            | %                | 8    |
| 53      | <            | >            | #                | 9    |
| 54      | ¢            | ¿            | ?                | 0    |

The final key in Row 42 is the a. List/1. List/A. List/I. List key 55. This key 55 is used to make an outline style list with text. Depressing key 55 alone will produce an outline format using Roman numerals. Depressing key 55 with either of Shift key 10 or 12 will produce an outline format using capital letters. Depressing key 55 with Shift key 14 will produce an Arabic numbered outline format. Depressing key 55 with Shift key 15 will produce an outline format using lower case letters. Accordingly, keys 44–55 in row 42 are preferably color coded to assist the typist in selecting desired command or functions. For example, key 55 has "a. List" in blue, "1. List" in red, "A. List" in green, and "I. List" in black.

Below Row 42 is Row 68. Directly below and aligned with keys 44, 49, 50 and 55 are keys 70, 72, 74 and 76, respectively. Key 70 constitutes an Insert/Copy/Move/Select Text key. When key 70 is pressed alone, the typist can select text. The typist can then move the text, by pressing key 70 with either Shift key 10 or 12. On the other hand, the typist can copy the selected text, by pressing key 70 along with Shift key 14. To insert the selected text at another location, press key 70 with Shift key 14 at the point of insertion.

Key 72 is the Back Tab/Tab key and essentially functions the same as the tab key on a conventional QWERTY keyboard. However, key 72 is considered to be located in a different, more advantageous location. In order to move to the next tab location, the typist needs to press key 72. To move to the previous tab location, key 72 must be depressed with one of Shift keys 10, 12. Key 74 is the Delete/Backspace key. When key 74 is pressed the backspace function is activated and the character to the left of the current cursor position is erased. When key 74 is depressed at the same time as one of Shift keys 10, 12, the character to the right of the current cursor position is erased. The location of keys 72 and 74 is noteworthy in accordance with this invention. First, the commands which are activated by these keys are commonly used, and by moving them to the center of the keyboard, the fingers which depress key 72 and 74 do not have to travel great distances to do so. Second, when positioned in accordance with the invention, keys 72 and 74 are arranged to be pressed by much stronger fingers, i.e. the index and middle fingers, as opposed to the pinky fingers as in the QWERTY keyboard.

The last key in Row 68 is a mathematics key 76, i.e., a "÷/+/=/−" key. The individual symbols are inserted by depressing key 76 with either Shift key 14, Shift key 15, one of Shift keys 10, 12, or alone, respectively. Similarly, key 76 is marked so that the typist can look at the key and know which shift command key 10, 12, 14, 15 in zone 8 is required.

Below Row 68 is Row 78. Directly below and aligned with keys 70 and 76 are keys 80 and 82. Key 80 is the { }/[ ]/( ) key. When key 80 is depressed with Shift key 15, one of Shift keys 10, 12 or alone, the keyboard inserts a {, [ or (, respectively. The second time key 80 is pressed along with the correct shift command key 10, 12, 13, 15, the keyboard 1 detects whether it should insert the open symbol or the close symbol—i.e.},], or)—associated with key 80. Key 80 is preferably marked and color coded so that the typist can look at the key and know which shift command key 10, 12, 14, 15 in zone 8 is required. Key 82 is the ' '/" "/' '/" "key. When key 82 is depressed with the Shift key 14, Shift key 15, either of the Shift keys 10, 12, or alone, a ', ", ', or ", respectively will be inserted. The second time key 80 is depressed along with the corresponding shift command key 8, the keyboard 1 signals for the insertion of the appropriate open or close symbol (i.e. ',", ', or ") associated with key 82. Again, key 82 is preferably marked and color coded so that the typist can simply look at key 82 and know which shift command key in zone 8 is required.

Below Row 78 is Row 84. Directly below and aligned with keys 80 and 82 are keys 86 and 90. Two rows below and aligned with keys 72 and 74 are keys 92 and 94. Key 86 is the Undo/Redo/Go to Page key. When key 86 is pressed alone, the typist can enter a specified page to be displayed on monitor 2. When key 86 is pressed with either of Shift keys 10, 12, the previous command or typing is returned. When key 86 is pressed with Shift key 15, the previous command or typing is reversed or eliminated. Key 86 is marked so that the typist can look at the key and know which shift command key in zone 8 is required. Key 90 is the Superscript/Subscript/Escape key. The escape function is activated by pressing key 90 alone, and takes on different abilities depending upon the cursor position and status of the document. Pressing key 90 with either Shift key 10 or 12 causes the text to take on a subscript font style. Pressing key 90 with Shift key 15 causes the text to take on a superscript style. Key 90 is marked so that the typist can look at the key and know which shift command key from zone 8 is required. Key 92 is the . . . /:/. key. When key 92 is pressed alone, a period (.) is inserted. Pressing key 92 with either Shift key 10 or 12 inserts a colon (:). Pressing key 92 with Shift key 15 inserts an ellipsis ( . . . ) at the current cursor location. If pressed twice in succession, ellipsis will appear from the cursor location to the right margin. Key 92 is also marked or color coded so that the typist can look at the key and know which shift command key 10, 12, 15 is required. Key 94 is the ;/, key. Pressing key 94 alone inserts a comma (,), and pressing key 94 with one of Shift keys 10 and 12 inserts a semi-colon (;) at the current cursor location. Again, it is preferable to color code key 94 so that the typist can readily know if shift command key 10, 12, is required.

Arranged throughout Row 68, Row 78, and Row 84 are the twenty-six letter keys of the English language. When a letter key 96–121 is pressed alone, a lower case letter character is inserted. When a letter key 96–121 is pressed along with a shift key 10 or 12, a capital letter character is inserted. The letter keys in Row 78, i.e., the home row, are the most commonly used letter keys of the English language according to current statistics with a letter frequency of 74% (Italian—73%, French—72%, Spanish—69%, and German—69%). In contrast, QWERTY's home row has a letter frequency of only 30%. More specifically, keys 96-105 correspond to "R", "E", "A", "D", "O", "N", "T", "H", "I" and "S" letters, respectively. In accordance with the invention, these letter keys are arranged in a series of multi-letter English words, i.e. "READ", "ON", and "THIS", so that it is easy to remember where the keys are located. By placing these specific letters in the home row, the fingers need not move far in order to strike the most commonly used letters. Again, attention is directed to the beginner. The present keyboard is designed to be user friendly.

The remainder of the letter keys 106–121 are also arranged to assist in remembering their location, specifically in horizontal groups of four. Keys 106–109 are used for letters "P", "L", "U", and "M" respectively, and are placed directly above the home row and aligned with keys 96–99. Keys 106–109 are arranged to spell out the simple English word "PLUM". Keys 110–113 are used for "K", "j", "V", "B", respectively, and are located directly below the home row and aligned with keys 96–99. The sequence of letters (KJVB) has been chosen to correspond with the first letters of the title of a well-known book, King James Version of the Bible. Keys 114-117, "W", "X", "Y", and "Z", respectively, correspond to the easily remembered final four letters of the English alphabet. The final four letters "C", "F", "G", and "Q" are covered by keys 118–121, respectively. In addition, the letter keys are more equitably distributed among the fingers with each finger now commanding three letter keys each, except the index fingers, the strongest fingers, which command four letter keys each. The majority of the finger range is directly up and down in the present keyboard, as opposed to up and over or down and over in QWERTY, to help reduce finger stress and achieve typing fluidity.

Below Row 84 is Row 148. Directly below and aligned with keys 111 and 112 are keys 150 and 152. Key 150 is the Para Start/Doc Start/Line Start key. Pressing key 150 alone places the cursor at the beginning of that line. Pressing key 150 with Shift key 10 or 12 places the cursor at the beginning of the document. Pressing key 150 with Shift key 15 places the cursor at the beginning of the paragraph. Key 150 is marked, such as through color coding as discussed above, so that the typist can look at the key and know which shift command key 10, 12, 15 in zone 8 is required. Key 152 is the tPage Top/Page Up key. Pressing key 152 alone places the cursor one-third page up at each depression. Pressing key 152 along with a Shift key 10, 12 places the cursor at the top of that page and preceding pages at each depression. Again, key 152 is preferably color coded.

Directly adjacent to key 152 below Row 84 is key 154, the Page Break/Enter-Return key. Pressing key 154 alone moves the current cursor position down one line. Pressing key 154 with one Shift key 10, 12 creates a page break at the current position. Directly adjacent to key 154 and below Row 84 is key 156, the Nonbreaking Space/Space key. Pressing key 156 alone inserts a space at the current cursor position. Pressing key 156 along with one Shift keys 10 and 12 inserts a space, but ensures that the word after the space and the word before the space remain on the same line.

Below Row 148 is Row 158. Directly below and aligned with keys 150 and 152 are keys 160 and 162. Key 160 represents a Para End/Doc End/Line End key. Pressing key 160 alone places the cursor at the end of that line. Pressing key 160 with a Shift key 10, 12 places the cursor at the end of the document. Pressing key 160 with Shift key 15 places the cursor at the end of the paragraph. Key 162 is the ↓Page Top/Page Down key. Pressing key 162 alone places the cursor one-third page down at each depression. Pressing key 162 along with a Shift key 10, 12 places the cursor at the top of the next page and succeeding pages at each depression. Again, each of keys 150, 152, 154, 156, 160 and 162 are preferably color coded to assist the typist.

Extending from Row 148 to Row 158, and below keys 115 and 116 is a Scroll button 164. Button 164 is biased to a centered position and when a side of the key is pressed, the cursor position toggles in that direction. Key 164 is marked with arrows to show the typist where to press in order to reposition the cursor as needed.

By constructing keyboard 1 in the manner set forth above, it is apparent that a person just learning to type will be able to more readily remember the location of the various letters of the alphabet given the fact that various specific words are directly spelled out. This is particularly important with respect to the home row 78 which not only contains the most commonly used letters of the alphabet, but which has the letters arranged to form words that can be easily remembered such that the position of the various individual keys can be easily mastered. Most particularly, the consonants "N", "R", "S" and "T", along with vowels "A", "E", "I" and "O" are provided here. The letters "D" and "H" are also provided on the home row in the most preferred embodiment to complete the desired, readily recognizable words.

Since the most commonly used keys are presented on the home row, the overall distance which the fingers of the typist must travel when producing a word document would be minimized by utilizing keyboard 1 of the present invention versus a standard QWERTY keyboard. Furthermore, the advantageous position of tab key 72 and backspace key 74 in a central area of the overall array of keys provided on keyboard 1 is considered to be particularly advantageous as these keys can now be readily pressed with minimal movement of the index finger of the typist's left and right hands respectively. It is considered that the backspace key 74 is utilized a fair amount in typing and is located in an awkward position in a QWERTY style keyboard which greatly reduces the speed of the overall typing operation.

In addition to other advantageous features of the invention as should be readily apparent to one of ordinary skill in the art given the description provided above, it should also be particularly noted that the presence and location of the various shift keys 10, 12, 14 and 15 will greatly enhance the ease of use of keyboard 1 versus prior known arrangements as the shift keys can now be activated by a user's thumbs. Obviously, with a minimal amount of movement of the thumb is required versus the known prior art wherein a pinky would have to be removed from one of the home row letter keys for this purpose.

Although described with reference to a preferred embodiment of the invention, it should be readily apparent that various changes and/or modifications can be made to the invention without departing from the spirit thereof. In particular, it should be realized that keys 10, 12, 14 and 15 have all been designated as "Shift" keys, as opposed to shift, alt and control keys on a contemporary keyboard. Regardless, it should be apparent that similar designations could be utilized. Regardless, these keys generally equate in function to the known control keys, but more advantageously positioned. In general, the invention is only intended to be limited by the scope of the following claims.

I claim:

1. A keyboard for use in performing typing tasks comprising:
   a base having an upper side; and
   a plurality of keys arranged in an array, including multiple rows with one of the multiple rows being a home row, on the upper side of said base, said keys including letter keys, a tab key, a backspace key, at least three shift keys for establishing capital letters in combination with the letter keys, and at least one function key, each of said letter keys corresponding to a respective letter of an alphabet of a language, wherein said at least three shift keys are located in a lower central portion of said array, grouped directly adjacent one another, and arranged in at least two of the multiple rows, said at least three shift keys being adapted to be engaged by thumbs of a user, wherein one of said rows includes selected ones of said letter keys arranged to spell out at least three, consecutively arranged multi-letter words when read from left to right and wherein both the tab and backspace keys are centrally located within the letter keys and located in a row above the home row.

2. A keyboard for use in performing typing tasks comprising:
   a base having an upper side; and
   a plurality of keys arranged in an array, including multiple rows, on the upper side of said base, said keys including letter keys, a tab key, a backspace key, at least one shift key and at least one function key, each of said letter keys corresponding to a respective letter of an alphabet of a language, wherein one of said rows includes selected ones of said letter keys arranged to spell out at least three, consecutively arranged multi-letter words when read from left to right, wherein the language is English and the selected ones of the letter keys are selected from the group consisting of "R", "E", "A", "D", "O", "N", "T", "H", "I" and "S".

3. The keyboard according to claim 2, wherein the language is English and the three words comprise "READ", "ON" and "THIS".

4. The keyboard according to claim 3, wherein the one of said rows constitutes a home row in which fingers of a typist are adapted to be placed in an at rest condition.

5. The keyboard according to claim 2, wherein at least one of the multi-letter words is a four letter word and another of the multi-letter words is at least a three letter word.

6. A keyboard for use in performing typing tasks comprising:
   a base having an upper side; and
   a plurality of keys arranged in an array, including multiple rows with one of the multiple rows being a home row, on the upper side of said base, said keys including letter keys, a tab key, a backspace key, at least one shift key and at least one function key, each of said letter keys corresponding to a respective letter of an alphabet of a language, wherein both the tab and backspace keys are centrally located within the letter keys and located in a row above the home row.

7. The keyboard according to claim 6, wherein the tab key and the backspace key are located in the same row.

8. The keyboard according to claim 7, wherein the tab key is located to the left of the backspace key.

9. The keyboard according to claim 8, wherein the tab key is located directly adjacent the backspace key.

10. The keyboard according to claim 6, wherein the tab key and the backspace key are located in a third row down from a top of said base.

11. The keyboard according to claim 7, wherein said same row is located directly above the home row.

12. A keyboard for use in performing typing tasks comprising:
    a base having an upper side; and
    a plurality of keys arranged in an array, including multiple rows, on the upper side of said base, said keys including letter keys, a tab key, a backspace key, at least three shift keys for establishing capital letters in combination with the letter keys, and at least one function key, each of said letter keys corresponding to a respective letter of an alphabet of a language, wherein said at least three shift keys are located in a lower central portion of said array, grouped directly adjacent one another, and arranged in at least two of the multiple rows, said at least three shift keys being adapted to be engaged by thumbs of a user.

13. The keyboard according to claim 12, wherein the plurality of shift keys includes four adjacent shift keys.

14. The keyboard according to claim 12, wherein said plurality of shift keys are arranged in only two different rows on the keyboard.

15. The keyboard according to claim 12, wherein said at least three separate shift keys are color coded.

16. The keyboard according to claim 12, wherein two of said at least three separate shift keys perform identical functions.

17. The keyboard according to claim 12, wherein at least one of said plurality of shift keys constitutes a lower most key in the array.

18. The keyboard according to claim 12, further comprising:
    a scroll button located directly adjacent at least one of said plurality of shift keys.

* * * * *